United States Patent
Seager

[11] 3,742,756
[45] July 3, 1973

[54] ACCESS DUCT FOR PIPELINES
[75] Inventor: William Harold Seager, Edmonton, Alberta, Canada
[73] Assignee: W. H. Seager and Associates Ltd., Edmonton, Alberta, Canada
[22] Filed: Apr. 8, 1971
[21] Appl. No.: 132,350

[52] U.S. Cl. ............................................. 73/67.8 S
[51] Int. Cl. ........................................... G01n 29/00
[58] Field of Search ..................... 73/67.8 S; 249/89

[56] References Cited
UNITED STATES PATENTS
| | | | |
|---|---|---|---|
| 3,350,050 | 10/1967 | Buczala et al. | 249/89 |
| 3,496,764 | 2/1970 | Stouffer | 73/67.8 S |
| 3,141,478 | 7/1964 | Copeland | 249/89 |
| 2,785,450 | 3/1957 | Willett | 249/89 |

Primary Examiner—Richard C. Queisser
Assistant Examiner—Arthur E. Korkosz
Attorney—Ernest Peter Johnson

[57] ABSTRACT

A circular duct is mounted on the circumferential, bared surface of a buried, coated pipeline so that the duct and pipe surface combine to define a sealed, circumferential chamber. A vertical conduit, defining in and out ports, extends upward from the duct through the dirt fill over the line. The ports provide communication between the ground surface and the duct chamber. A steel tape, having an ultrasonic probe mounted thereon, can be threaded through the assembly to bring the probe into contact with the pipe wall to take wall thickness readings. Scales on the tape serve to locate the position of the hidden probe.

7 Claims, 6 Drawing Figures

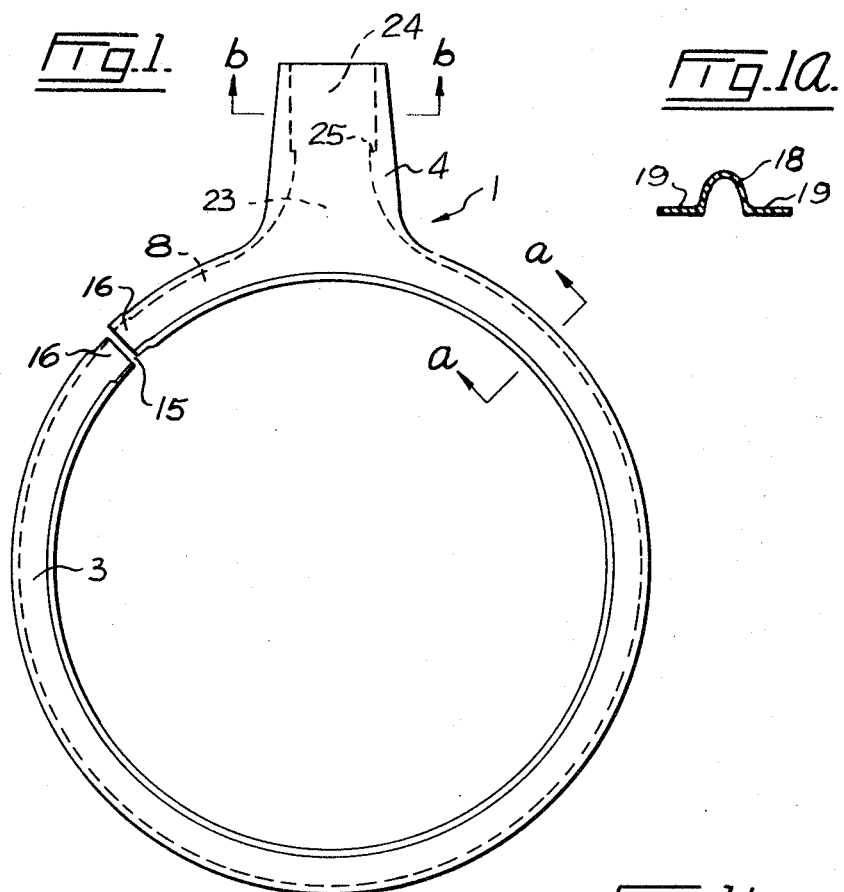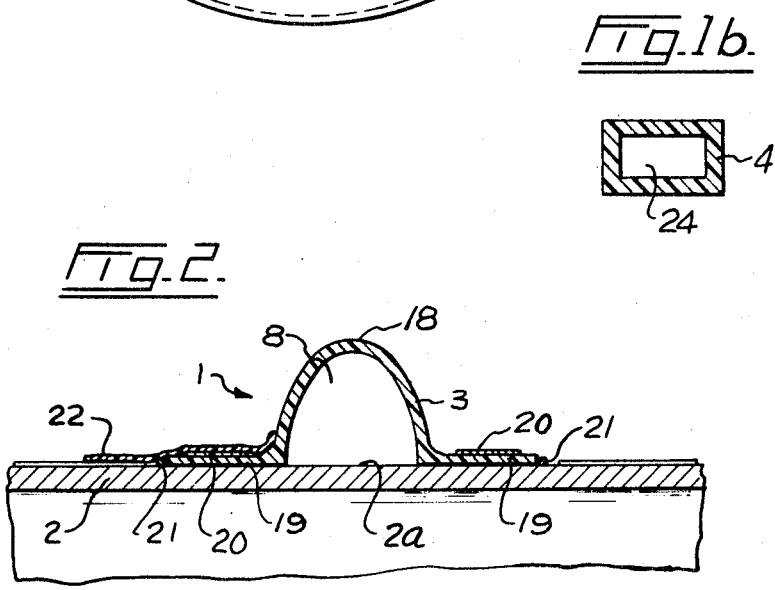

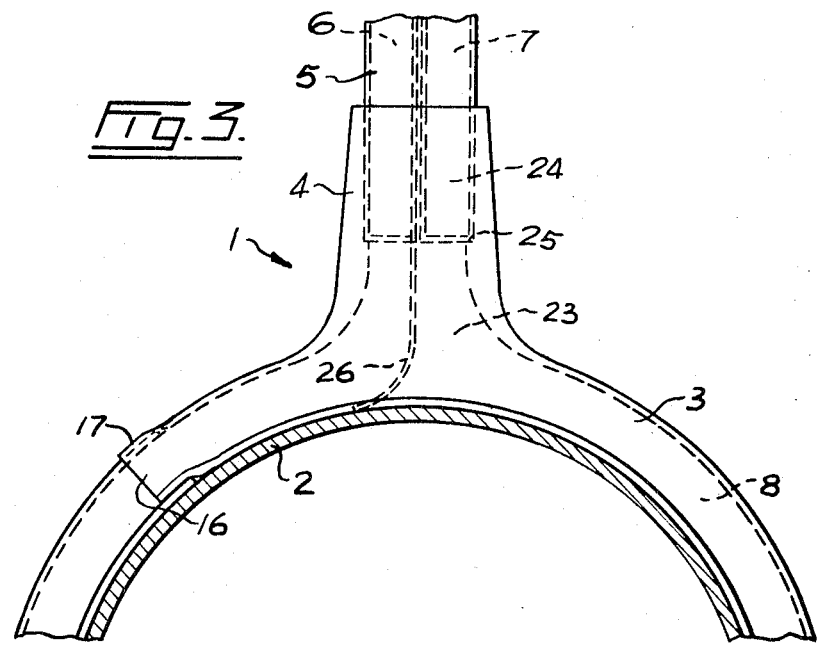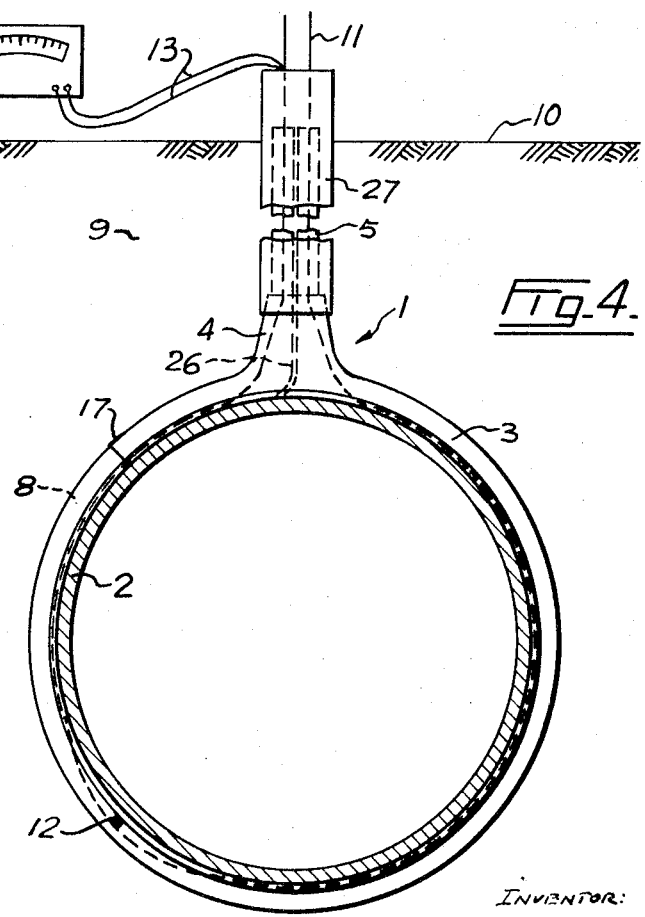

ACCESS DUCT FOR PIPELINES

BACKGROUND OF THE INVENTION

This invention relates to a duct structure through which a device, such as an ultrasonic probe, can be brought into contact with a normally inaccessible surface, such as the outer metal face of a coated pipeline. It also relates to a novel method for locating the device in position to take a reading.

A pipeline operator must periodically inspect its lines to determine the extent and rate of corrosion and wear which is taking place. Among several tools used for this purpose is the ultrasonic meter and probe apparatus, which gives a measure of wall thickness. This device comprises a crystal-carrying probe, used in much the same manner as a stethoscope, and a separate meter box, which houses the electric circuitry and metering mechanisms. The probe and box are connected by suitable wiring.

When using this tool, it is desirable that the probe be pressed against the pipe's metal surface in order to obtain readings. If the pipe is buried and/or coated, it is necessary to gain access to the pipe's surface at spaced intervals. The conventional method for doing this involves excavating pits at intervals along the line, removing a narrow strip of the coating and substituting a removable jacket therefor. The worker strips off the jacket when required and takes readings around the circumference of the pipe using the hand-held probe.

This system has some disadvantages. For example, the pits are expensive to provide and maintain and therefore are usually spaced widely apart. As a result, the completeness and accuracy of information obtained is less than what might be desired. A pit also creates a somewhat different environment, such as a variation in temperature, surrounding the buried pipe; this can lead to non-representative readings. In addition, the pits often become filled with water or snow and must be cleaned out before being used. Dangerous gases, such as hydrogen sulphide, also can accumulate in the pits and thereby create a hazard for the workmen.

SUMMARY OF THE INVENTION

It is therefore an object of this invention to provide a structure which can be mounted on an enclosed element, such as a buried, coated pipeline, and which provides ready access to a portion of the outer surface of the element so that a device, such as an ultrasonic probe, can be accurately positioned against the surface.

It is another object to provide an access structure of this type which is inexpensive and which can be permanently buried with the pipeline while remaining operative for its function.

It is another object to provide an access structure which is adapted to prevent corrosion of a bared portion of the enclosed element and so also provide a cathodic protection test station.

It is another object to provide a technique for accurately positioning at spaced intervals of time an instrument acting as the enclosing or covering medium, such as an ultrasonic probe, against the bared, hidden surface of a pipeline.

In accordance with the invention, a duct, having a longitudinal gap formed in its wall, is attached to the outer surface of a bared section of the pipeline. The open-sided duct and bared pipe wall together form a long chamber. Access means, preferably defining side-by-side in and out ports, is connected into the duct. The product assembly is suitably sealed, to prevent foreign matter from entering the chamber, and closed in with the enclosure (such as coating and/or fill) surrounding the line. The access means provides communication between the duct chamber and the open space exterior to the line enclosure. A permanent, fixed access assembly is thus provided through which an instrument may be inserted to place it in contact with the pipe wall.

The invention has several advantages if compared with the devices of the prior art. For example, the duct and access conduit is relatively inexpensive and easy to install, particularly if this is done when the line is laid. In consequence, close spacing of the installations can be justified. The decrease in testing station spacing means that more representative data can be assembled. This raises the possibility of reducing the frequency with which expensive surveys of other types, such as electric induction logging, are run. Since the assemblies are buried with the line, the conventional pits, with their attendent problems, are eliminated.

The invention has been described up to this point with reference to its application to buried, coated pipelines. However, it has wider application than that. It can, for example, be used in conjunction with above-surface, coated and/or thermally insulated pipes, such as are present in refineries. In addition, the assembly is capable of accomodating a variety of instruments and tools, such as the magnets used in electrical induction logging surveys. In other words, the assembly finds use in providing access for a number of devices to a variety of objects whose outer surfaces are not normally accessible.

DESCRIPTION OF THE DRAWINGS

In drawings which illustrate a preferred embodiment of the invention:

FIG. 1 is a front plan view of the circular duct, showing an outline of the inner surface in shadow lines;

FIG. 1a is a cross sectional elevation of the duct taken along the line A—A in FIG. 1;

FIG. 1b is a cross sectional elevation of the duct socket taken along the line B—B in FIG. 1;

FIG. 2 is a cross sectional elevation of the duct mounted on a pipe surface;

FIG. 3 is a front view, partly in section and showing interior surfaces in shadow lines, providing details of the overlap connection of the duct ends and the connection of the socket and conduit; and FIG. 4 is a front view, partly sectional and diagrammatic, showing the operation of inserting a tape whth an ultrasonic crystal mounted thereon.

DESCRIPTION OF THE PREFERRED EMBODIMENT

With reference to the drawing, an access assembly 1 is shown mounted on a circumferential, bared segment 2a of pipe 2. The assembly 1 comprises a circular duct 3 fitted around the circumference of the pipe 2, a socket member 4 extending upward from the duct 3, and a vertical conduit 5 connected with the socket member 4. The conduit 5 defines in and out ports 6, 7 which are in communication with the duct chamber 8. Since the conduit 5 extends through the fill 9, access is provided from the ground surface 10 to the chamber 8. In use, a tape 11 is threaded through the assembly 1;

the tape 11 has an ultrasonic probe 12 mounted on it and lead wires 13 connect the probe 12 with the ultrasonic wall thickness meter 14 at ground surface.

In greater detail, the duct 1 is a substantially rigid member formed of polyester resin having fibre-glass matting embedded in it. This material is used because it has good corrosion resistance and strength approaching that of steel. As shown in FIG. 1, the duct 1 is split at 15 to allow it to be stretched longitudinally into spiral form for slipping onto the pipe 2. Its ends 16 overlap and form a junction 17 when the duct is tightened in place on the pipe 2. As shown in FIGS. 1 and 2, the duct comprises a longitudinal, U-shaped, groove-forming central portion 18 and a pair of integrally attached, longitudinal side flanges 19. When the duct 1 is mounted on the pipe 2, the flanges 19 lie flat on the bared segment 2a, and the central portion 18 combines with the segment 2a to form the circumferential chamber 8. The duct 1 is tightly clamped in place on segment 2a with stainless steel bands 20. These bands 20 are each formed of links held together by screw connectors (not shown) which can be tightened. The duct 1 and bare pipe segment 2a on either side of the duct are suitably protected from corroding elements. This is done by providing a bead 21 of sealant, such as silicone rubber, against the edges of the duct 1 and a coating 22 of plastic tape and mastic over the flanges 19 and exposed pipe surface 2a. Sacrificial zinc anodes can be inserted in the chamber 8 when the unit is not in use to provide the bared surface 2a with cathodic protection. This can be done by threading a wire, having anodes mounted thereon, into the chamber 8 and electrically connecting one end of this wire through a test lead to the surface 2a.

A socket member 4 extends up from the duct 1. This member 4 has a passageway 23 formed through it which leads into the duct chamber 8. The passageway 23 includes a counterbore 24 at its upper end. The annular shoulder 25, defined by the counterbore 24, functions as a stop for the conduit 5 when it is added to the assembly.

Tubular means, defining in and out ports 6, 7, are connected with the socket member 3. As shown, such means may comprise a pair of rectangular conduits 5 having their bases fixed in the counterbore 24. The conduits 5 are of sufficient length to extend above the ground surface when the pipeline is back filled. The ports 6, 7 combine with the passageway 23 to provide communications between the chamber 8 and space above ground level.

Guide means, associated with the chamber 8 and socket member 23, are provided to direct an inserted tape from the in port 6 into the chamber 8 and back out the out port 7. The means shown is a tab 26 extending downwardly from conduit 5.

A plastic pipe 27 is slipped over the conduits 5 to protect them from soil stress and frost heaving. A suitable cap (not shown) is placed over the pipe's upper end to prevent moisture and dirt from entering the chamber 8.

A novel method for positioning an instrument at a pre-determined point within the chamber 8 of a symmetrical assembly 1 is also within the scope of the invention. The technique involves using a semi-rigid member, such as the metal tape 11, having the probe 12 mounted thereon intermediate its ends and having scales marked thereon extending outwardly from each side of the probe. The tape 11 is threaded through the in port 6, duct chamber 8 and out port 7 so that its two ends may be grasped at surface in the operator's hands. To locate the probe 12 at the bottom dead centre of the pipe 2, regardless of variations in pipe depth, the tape 11 is fed through the assembly 1 until the graduations on each of the scales match up, indicating that there is an equal length of scaled tape on each side of the hidden probe. The probe is then moved in either direction over approximately the bottom three quadrants of the pipe circumference to take readings at selected intervals. The distances moved are read off from the tap scales at surface. When a reading is taken, the tape ends 7a are simply pulled up tightly to press the probe 12 into good contact with the pipe segment 2a. If needed, the performance of the probe 12 may be improved by providing a couplant, such as oil, between the probe and pipe wall.

A top dead centre reading can be taken by mounting a probe on a rod and inserting it directly down to the pipe surface through the in port.

A preferred form of the invention has been shown; it is to be understood that various changes may be made in its construction by those skilled in the art without departing from the spirit and scope of the invention as set forth in the appended claims.

What is claimed is:

1. In combination: a tubular member having a normally inaccessible outer surface within an enclosing medium; and a permanent assembly for providing access to a circumferential bared segment of the member, said assembly comprising: an open-sided duct attached and sealed to the bared segment, said duct combining with the bared segment to define a chamber extending around the circumference of the member, tubular access means connected with the duct and communicating with the chamber, said access means extending outwardly from the duct through the enclosing medium to provide exteriorly available access into and out of the chamber from the exterior of the enclosing medium; and means associated with the chamber at the access means for directing a member inserted through the access means into the chamber and from the chamber back into the access means.

2. The combination as set forth in claim 1 wherein: the tubular member is a buried, coated pipeline.

3. The combination as set forth in claim 2 wherein: one or more bands, associated with contracting means, are coextensively positioned on the duct to tightly clasp it to the pipeline.

4. An assembly for providing access to the normally inaccessible outer surface of an enclosed pipe and testing the same which comprises:

a circular duct, having an inwardly opening, groove-forming portion, adapted to be fitted around the pipe to define a circumferential chamber in combination with the outer surface of the pipe;

a socket member, extending outwardly from the duct, defining a passageway extending from its outer end and communicating with the groove;

tubular means, defining in and out ports, adapted to connect with the socket member to provide access into and out of the chamber through the tubular means;

and a flexible tape-like member passing through the chamber, socket member and tubular means, and carrying a test probe within the chamber, and accessible exteriorly of the tubular means for manipulation to selectively position the probe relative to the circumference of the enclosed pipe.

5. The assembly as set forth in claim 4 wherein:
the duct is transverly split whereby it may be easily slipped onto the pipe.

6. The assembly as set forth in claim 5 wherein:
the duct comprises a U-shaped, longitudinal central portion and a pair of longitudinal side flanges which are each integral with one side wall of the central portion.

7. A method of positioning an ultrasonic probe against the normally inaccessible surface of an enclosed pipe having an access assembly mounted thereon, said assembly comprising a circumferential duct, attached to said surface, to provide a duct chamber around the pipe and a conduit member providing communication with the duct chamber and extending through the pipe enclosure, which comprises:
inserting one end of a semi-rigid, elongate member, such as a steel tape, having the probe mounted on its inner surface intermediate its ends, through the conduit member, around the duct chamber and out through the conduit member to substantially encircle the pipe with the ends of the elongate member juxtaposed exteriorly of the conduit member;
sliding the member through the assembly to position the mounted probe at a pre-determined position; and
manipulating the two ends of the elongate member, exteriorly of the conduit member to bring the probe into firm contact with the pipe surface.

* * * * *